Oct. 13, 1953  A. J. MORRIS  2,654,994
CONTROL DEVICE FOR FUEL SYSTEMS
Filed Sept. 30, 1949  3 Sheets-Sheet 1

Inventor
Alberto Jorge Morris
By Hooper Leonard & Glenn
his attorneys

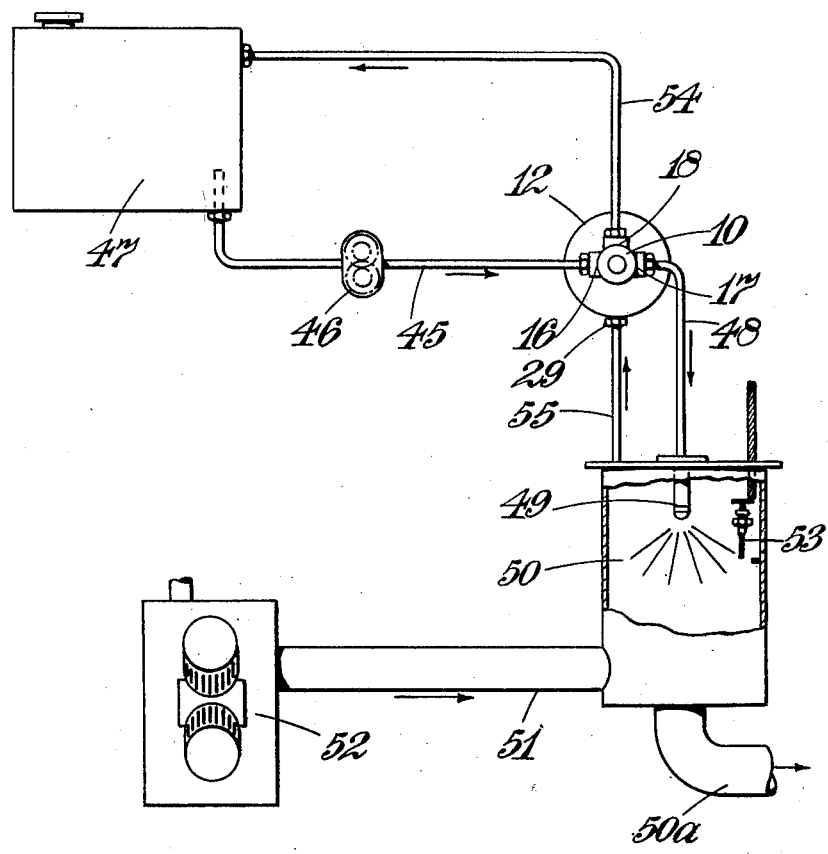

Patented Oct. 13, 1953

2,654,994

UNITED STATES PATENT OFFICE 2,654,994

CONTROL DEVICE FOR FUEL SYSTEMS

Alberto Jorge Morris, Dursley, England, assignor to R. A. Lister & Company Limited, Dursley, England, a British company Application September 30, 1949, Serial No. 118,846
In Great Britain November 8, 1948

6 Claims. (Cl. 60—39.28)

This invention relates to fuel control devices of the class for use with fuel systems associated with apparatus comprising a combustion chamber to which pressure air and liquid fuel are supplied in a substantially continuous stream, for instance for fuel systems associated with combustion equipment of gas turbines or domestic or industrial water boilers or steam generators.

According to this invention, a fuel control device of the class described comprises a valve body having a fuel inlet, a pair of fuel outlets, a valve member located in a valve body between the inlet and outlets, and arranged for movement between two positions in one of which positions fuel can flow from said inlet to one outlet and in the other of which positions fuel can flow to the second outlet, and valve-operating means comprising a chamber arranged for connection to the combustion space in the associated apparatus, a pressure-responsive device arranged in said chamber so as to be subjected to the pressure in the combustion space and to be capable of displacement according to the pressure in the combustion space, cooperating abutment means on the pressure-responsive device and on the valve member so that the latter follows displacements of the former, and a return spring operable on the valve member against the action of the pressure on the pressure-responsive device.

One of the outlets from the valve body will be connected to the fuel injection device associated with the combustion space and the other will be connected to fuel pump inlet or to the fuel tank; the valve-operating means will be arranged so that, when the pressure within the combustion space (and thus in said chamber) falls below a selected value, the valve member will be moved to direct fuel to the second of said outlets thus cutting off the fuel supply to the injection devices and returning the fuel to the pump inlet or fuel tank.

The pressure within the combustion space will be higher when the fuel supplied to it is burning than when the flame is extinguished and the control device will therefore be arranged to operate at a pressure which is below that existing in the combustion space when the fuel is burning and above that existing when the flame is extinguished.

According to a feature of this invention, means to over-ride the control device may be provided for use when starting up combustion in the apparatus with which the control device is associated and this over-riding means is conveniently manually-operated.

In a preferred form of control device of this invention, the pressure-responsive device is a diaphragm and the valve means is in the form of a piston valve connected to the diaphragm by a push-rod.

One construction of control device will now be described with reference to the accompanying drawings in which:

Figure 3 is a diagrammatic illustration of the use of the control device in combustion apparatus for producing a supply of hot gas, such as may be employed for dispersing a liquid as an aerosol.

Figure 1:
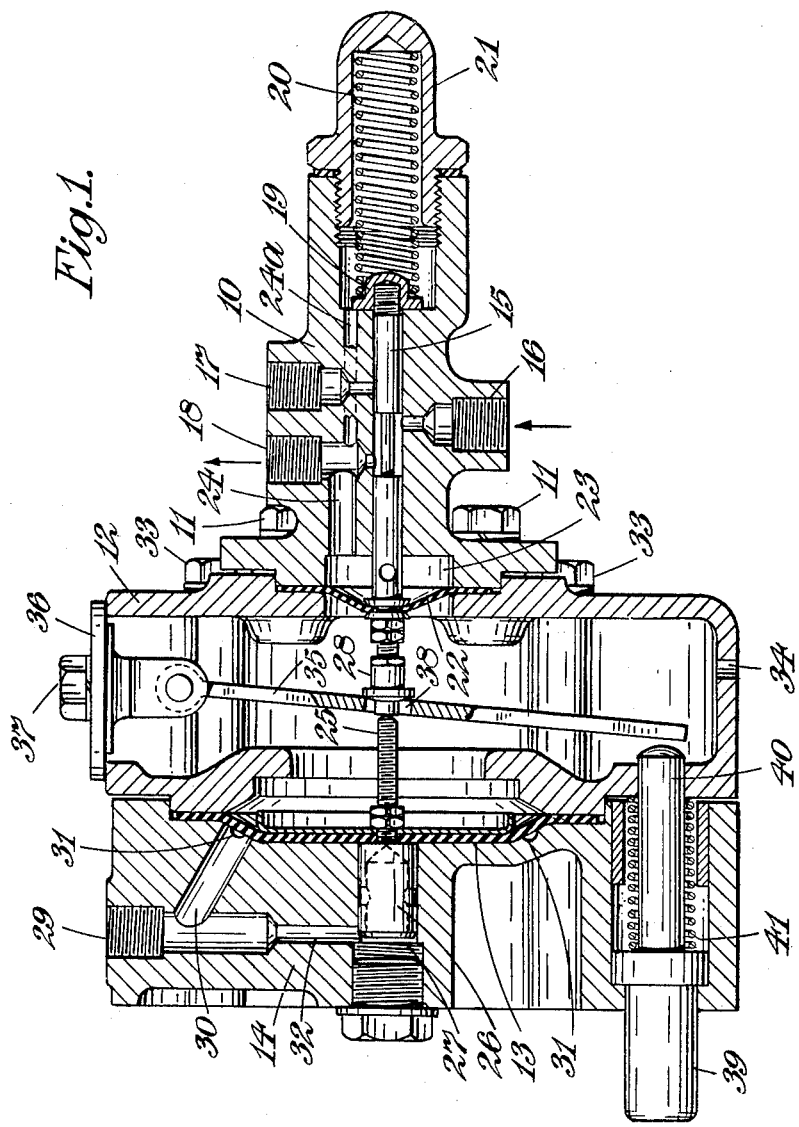
Figure 1 is a section through the control device.
Figure 2:
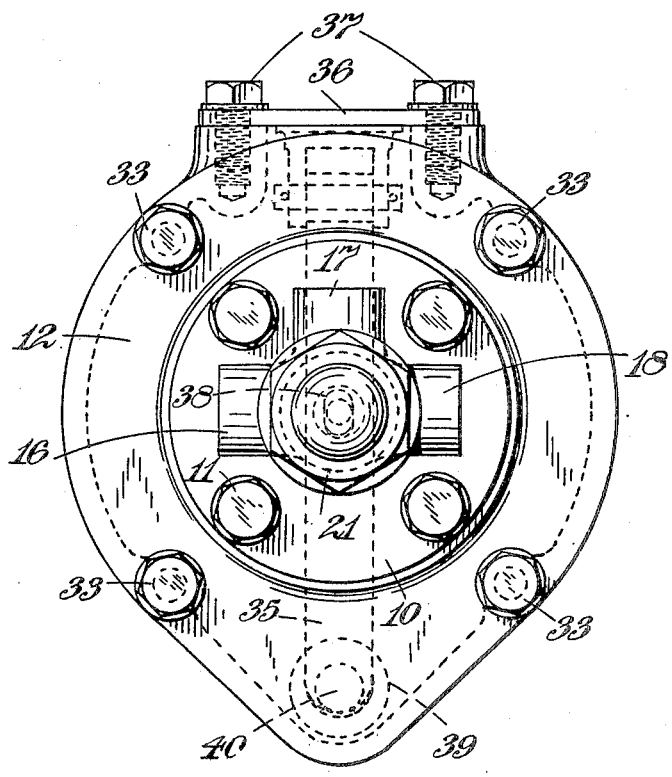
Figure 2 is a view on one end of the device.

The control device comprises a valve body 10 which is secured by studs 11 to a hollow casing 12, and a diaphragm 13 which is clamped peripherally between co-operating faces on the hollow casing 12 and a head plate 14, which is secured to the casing by studs 33.

The valve body 10 is bored centrally to receive a piston valve 15 slidable in the bore and is formed with three bosses 16, 17, 18. The boss 16 provides a fuel inlet connection to the central bore, and is connected by an inlet fuel pipe 45 to the delivery side of a pump 46 which draws fuel from a tank 47. The boss 17 provides an outlet which in use is connected by a pipe 48 to a fuel injection device 49 arranged to deliver fuel into a combustion chamber 50 which is fed with combustion air through conduit 51 by compressor 52 and which is provided with an igniter device 53 and a hot gas outlet 50a. The boss 18 provides an outlet connected by pipe 54 with the fuel tank 47 of the fuel supply system associated with the combustion apparatus, that is in effect to the suction side of the fuel pump 46.

The right-hand end (as viewed in Figure 1) of the piston valve carries a cap 19 providing an abutment for a spring 20 having a second abutment against a cap nut 21 secured to the valve body 10.

The left-hand end of the piston valve 15 is connected to a diaphragm 22 clamped peripherally between the valve body 10 and hollow casing 12 to close off a recess 23 in the end of the valve body from the hollow casing, the recess 23 being connected to the outlet 18 by a duct 24. A duct 24a connects the outlet 18 to the return spring space. The right-hand end of a guide block 26 is provided with a threaded extension 25 which extends through diaphragm 13 and abuts against a shoe 28 screwed on the end of valve 15.

The diaphragm 13 is secured to the guide block 26.

The head plate is provided with a union connection 29 by which a duct 30 in the head plate can be connected as by pipe 55 to the combustion space 50 of the associated apparatus, and the duct 30 communicates with an annular groove 31, forming a pressure chamber, provided in the right-hand face of the head plate. The central bore 27 is also in communication with the duct 30 through a passage 32.

The interior of the hollow casing is in communication with atmosphere through a port 34 and houses a pivoted strip-like lever 35 carried by a plate 36 secured by studs 37 to the casing 12. The lever 35 has an aperture 38 formed in it and the shoe 28 is so positioned that a flange on it is in contact with the lever.

A press-button 39 is mounted in a recess in the head plate 14 and carries a tappet portion 40 projecting into the casing 12 close to the free end of lever 35. A spring 41 urges the press-button 39 to the left as viewed in the drawing.

As will be clear from the above description, with the valve in the position shown fuel entering the valve body through inlet 16 flows away through outlet 18 and thus does not pass to the combustion chamber.

When the apparatus with which the control device is associated, is to be started up, push-button 39 is depressed thereby rocking lever 35 and urging the piston valve 15 to the right to bring the cut-away on the valve opposite outlet 17 thus allowing fuel to flow to this outlet and to the injection devices. During this movement return spring 20 is compressed. When combustion is started pressure is built up in the combustion space 50 and thus on the left-hand side of diaphragm 13 which moves to the right to bring the extension rod 25 into abutment with the shoe 28 and when the push-button 39 is released the valve will remain in its right-hand position in which fuel can flow through pipe 48 to the combustion space 50.

So long as combustion persists, the piston valve will be held to the right by the pressure on the diaphragm 13, but should for any reason the flame in the combustion space 50 be extinguished the pressure on the diaphragm 13 will fall and the return spring 20 will become operative to move the valve back to the position shown cutting off the fuel supply through pipe 48 to the injection device 49.

As soon as the cut-away on the valve 15 comes opposite the outlet 18, the fuel delivery pressure will be communicated to the right-hand side of diaphragm 22 assisting in return movement of the valve.

If during starting of the apparatus, ignition of the fuel does not occur the valve 15 will be automatically returned to the position shown on release of the push-button 39.

The device will also operate if the supply of pressure air through conduit 51 to the combustion space 50 fails or if leaks develop in the combustion space 50.

I claim:

1. Combustion apparatus comprising means affording a combustion space, a source of liquid fuel including means to pressurise said liquid fuel, fuel injector means arranged to deliver fuel into said combustion space, said fuel injector means being connected to be supplied with fuel under pressure from said source, a return fuel pipe connected to said source, and a control device to control the supply of liquid fuel under pressure from said source to said fuel injectors and to control the flow of return fuel into said return fuel pipe including a valve body having a fuel inlet connected to receive fuel from said source and a pair of fuel outlets, the first of said outlets being connected to said fuel injector means and the second of said outlets being connected to said return fuel pipe, a valve member located in the valve body between the inlets and the outlets and arranged for movement between two positions, in one of which positions fuel can flow from said inlet to the first of said outlets and in the second of which positions fuel can flow from the inlet to the second of said outlets, and valve operating means comprising a chamber, a pressure-transmitting connection from said combustion space to said chamber, a pressure-responsive device arranged in said chamber to be subjected to and displaced in accordance with the pressure in said combustion space, co-operating abutment means on the pressure-responsive device and on said valve member so that the valve member follows the displacements of the pressure-responsive device in a direction towards said first position of the valve member, and a return spring arranged to urge the valve member towards said second position against the action of the pressure on the pressure-responsive device, whereby on fall of pressure within said combustion space the valve member is moved to reduce the supply of fuel to said fuel injection means.

2. Combustion apparatus as claimed in claim 1, wherein said valve member is a piston valve element slidable in the valve body and carrying an abutment shoe at one end and said pressure-responsive device comprises a flexible diaphragm forming a wall of the pressure chamber and having a central extension projecting into abutment with said shoe.

3. Combustion apparatus as claimed in claim 2, comprising also a hollow casing located between said flexible diaphragm and said valve body to accommodate said extension and said shoe, and also to accommodate a manually-rockable lever arranged to abut said shoe to displace the piston valve against the action of said return spring.

4. Combustion apparatus as claimed in claim 3, comprising also a second flexible diaphragm which is connected to the piston valve and to the valve body to close a recess in the valve body and a duct connection from said recess to the second of said outlets.

5. A fuel control device comprising a housing structure affording a pressure chamber, a flexible diaphragm arranged to form one wall of said chamber, port means opening into said pressure chamber to permit the supply to said pressure chamber of a pressure fluid to displace said flexible diaphragm, an abutment member carried to be moved by said flexible diaphragm on variation in the pressure of said pressure fluid, a valve body having a fuel inlet and a pair of fuel outlets and having a recess formed at its end adjacent the abutment member, a piston valve member slidingly arranged in said valve body to move between positions in which said fuel inlet is placed in communication with said fuel outlets respectively, said piston valve member having a part in abutment with said abutment member to be moved into one of the positions by said flexible diaphragm, spring means arranged to urge said piston valve member towards said abutment member and to move the piston valve member into the other position, and a flexible sealing diaphragm connected peripherally to said valve body to form a wall of said recess and connected to said piston valve member to permit its sliding movement, said recess being connected by a duct to that one of the two fuel outlets which is placed in communication with the fuel inlet on movement of said piston valve member into said other position by said spring means.

6. A fuel control device as claimed in claim 5, comprising also a manually-rockable lever arranged to bear on the piston valve member to displace it against the action of said spring means.

ALBERTO JORGE MORRIS.

References Cited in the file of this patent

UNITED STATES PATENTS

| Number | Name | Date |
|---|---|---|
| 1,052,538 | Janicki | Feb. 11, 1913 |
| 1,320,936 | Scott | Nov. 4, 1919 |
| 1,528,074 | Ralston | Mar. 3, 1925 |
| 1,578,599 | Giesler | Mar. 30, 1926 |
| 1,716,244 | Sager | June 4, 1929 |
| 2,046,813 | Dunham | July 7, 1936 |
| 2,538,222 | Wilson | Jan. 16, 1951 |
| 2,604,756 | Greenland | July 29, 1952 |

FOREIGN PATENTS

| Number | Country | Date |
|---|---|---|
| 606,613 | France | Mar. 12, 1926 |
| 421,333 | Great Britain | Dec. 10, 1934 |